April 9, 1935. R. J. PARSONS 1,996,972
HEATING AND VENTILATING SYSTEM
Filed April 12, 1934
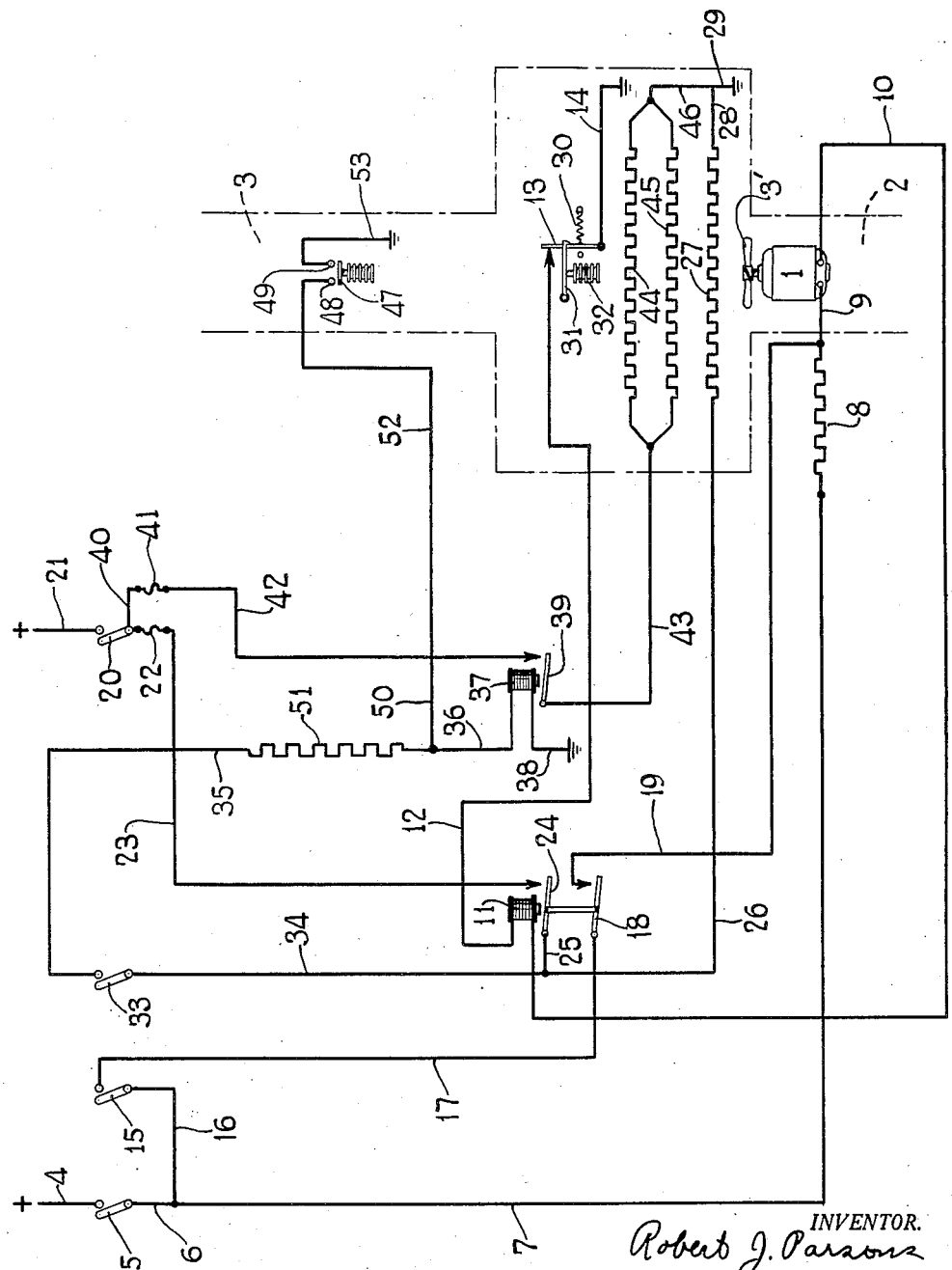
INVENTOR.
Robert J. Parsons
BY
Lyman E. Dodge
ATTORNEY Patented Apr. 9, 1935

1,996,972

UNITED STATES PATENT OFFICE 1,996,972

HEATING AND VENTILATING SYSTEM

Robert J. Parsons, Schenectady, N. Y., assignor to Consolidated Car-Heating Company, Inc., Albany, N. Y., a corporation of New York Application April 12, 1934, Serial No. 720,190

3 Claims. (Cl. 219—20)

This invention relates to heating and ventilating; especially to electrical heating and ventilating and more particularly to the heating and ventilating of movable vehicles such as cars and buses.

A principal object of this invention is to provide a system of heating and ventilating which is of such a nature that by the mere manipulation of a very few manually operable circuit closers the system may be used for ventilating in summer, without employing any heating apparatus, and may be operated to give either a low volume of air or a higher volume of air; and may be used not only for ventilating in winter, but also for heating the ventilated air, and for heating that air to different temperatures and moving it in low or in higher volumes.

A further object of the invention is to provide a system of the type specified which will also include heat responsive devices which are of such a nature that overheating of the air or the parts of the apparatus will be effectually prevented.

Other objects and advantages will appear as the description of the particular physical embodiment selected to illustrate the invention progresses and the novel features will be particularly pointed out in the appended claims.

In describing the invention in detail, reference will be had to the accompanying drawing which is a schematic or diagrammatic illustration of a system embodying applicant's invention with the several mechanisms and control circuits and apparatus shown therein in a conventional manner.

In the schematic illustration selected by applicant by which to explain the invention, numeral 1 designates a motor which is positioned in what might be called an intake duct 2. This motor has a fan 3 attached to its armature shaft which serves to draw in air through the duct 2 and force it into a space 3 to be heated.

The motor 1 is energizable by a circuit as follows: positive terminal 4 of a source of potential, manually operable circuit closer 5 in the closed position, wires 6 and 7, limiting resistance 8, wire 9, motor 1, wire 10, low heat relay coil 11, wire 12, thermostatically controlled circuit controller 13, and wire 14 to the negative terminal of the source. Current flowing in the above traced path caused by the closing of manually operable circuit closer 5 causes the motor 1 to operate and drive the fan 3 thus forcing air into the space 3. Due to the resistance 8, the motor 1 only moves at what I will call a low speed. The motor is only driven at this low speed when it is desired to have a relatively low volume of air pass into the space or chamber 3, such as would be desired at certain seasons of the year when the outside temperature is perhaps just a little higher than 70 degrees F.

If a greater volume of air needs to be moved, applicant closes the manually operable circuit closer 15, thereby establishing a shunt circuit around the resistance 8 by way of wire 16, circuit closer 15, wire 17, armature or circuit controller 18 in the closed position, and wire 19. The above traced shunt path is closed by closing manually operable circuit closer 15 when manually operable circuit closer 5 is closed because the circuit through the motor caused by the closing of manually operable circuit closer 5 energizes the relay coil 11 so that its armatures are in the raised position. The current flow from the source, the positive terminal of which is 4, is thus directed to the motor without going through the resistance 8, and consequently, the speed of the motor is largely increased so that an increased or higher volume of air is forced into the chamber 3.

If it is desired to heat the air which is to flow into the chamber 3, manually operable circuit closer 20 is closed so that a current flows as follows: positive terminal 21 of a source of potential, circuit closer 20, protecting fuse 22, wire 23, armature or circuit controller 24, wires 25 and 26, low heat heating coil 27 and wires 28 and 29 to the negative terminal of the source. The heating circuit only heats the low heat heating coil 27 which would be desirable in moderately cold weather so as to moderately heat the air forced into the chamber 3.

It is to be understood that when the manually operable circuit closer 20 is closed either or both manually operable circuit closers 5 and 15 may be closed. If 5 only is closed, a low volume of air would be blown over heating coil 27. If both 5 and 15 are closed, then a higher volume of air will be blown over low heat heating coil 27.

It will be noted that the circuit for heating coil 27 is through the armature 24 of the low heat heating coil 11 when in the closed position, that is, when the relay coil 11 is energized. It is further to be noted that the energization of coil 11 depends not only upon the closing of manually operable circuit closer 5 but upon the closed position of circuit closer 13. This circuit closer 13 is biased by the spring 30 to open position and is held in the closed position by the latch 31. This latch 31 is operable by the thermostatic or heat control device 32, that is, when the device 32 upon being subjected to heat arrives at a certain definite temperature it expands and moves the latch 31 upwardly as shown in the figure so that the biasing means or spring 30 opens the circuit controller 13, and so breaks the circuit of the relay 11 thereby dropping armature 24, and so breaking the circuit of the heating coil 27. By such an arrangement, one is prevented from causing current to flow through the low heat heating coil 27 if the temperature adjacent the coil 27 is equal to or greater than the certain predetermined temperature.

If a greater or higher heat than would be obtained by passing current through low heat heating coil 27 is desired, then the manually operable circuit closer 33 is closed whereupon current flows in a path as follows: positive terminal 21 of the source, manually operable circuit controller 20 in the closed position, protecting fuse 22, wire 23, armature 24, wires 25 and 34, manually operable circuit closer 33 in the closed position, wire 35, resistance 51, wire 36, relay coil 37 and wire 38 to the negative terminal of the source. Current flowing in the above traced path energizes the relay 37 and causes it to raise its armature or circuit controller 39 to the upper position thereby closing the circuit in which current flows as follows: positive terminal 21 of a source of potential, manually operable circuit closer 20, wire 40, protecting fuse 41, wire 42, armature 39 in the upper position, wire 43, high heat heating coils 44 and 45 in parallel and wires 46 and 29 to the negative terminal of the source.

When the coils 27, 44 and 45 are all energized the air moved by the fan 3' is very considerably heated and it may be passed over these coils either at low volume or high volume in accordance with whether or not one or both of the manually operable circuit closers 5 and 15 are closed.

In order to prevent the space 3 from becoming overheated applicant has positioned a thermostatic circuit controller 47 therein so arranged that when the heat becomes excessive the contact points 48 and 49 are bridged so that the current supplied to high heating coil 37 is substantially diverted, that is, is diverted to such an extent that the relay coil 37 is not energized sufficiently to maintain its armature 39 in the raised position, so that the circuit from wire 35 would be, instead of through coil 37, through wire 50, wire 52, contact point 48, circuit controller, bridge 47, contact point 49, and wire 53 to the negative terminal of the source. When the last traced path is completed and the armature 37 is robbed of its current flow to an extent preventing it from raising its armature 39, the circuit through armature 39 of the heating coils 44 and 45 is broken so that by suitably adjusting the thermostatic controller 47 danger of overheating the space 3 is avoided.

It will be observed that if the space adjacent the heating coils 27, 44 and 45 becomes overheated by reason of overheating of these coils then the circuit controller 13 will be open because latch 31 will be raised. This will effectually prevent the sending of further current through the heating coils 27, 44 and 45 and will require the attention of an attendant in order to restore the system to normal, that is, an attendant will be obliged, in order to restore the system to normal, to close the circuit controller 13 and latch it with latch 31 which, of course, would not be done unless the heating coils have come to a proper temperature.

Although I have particularly described one particular physical embodiment of my invention and explained the operation, construction and principle thereof, nevertheless, I desire to have it understood that the form selected is merely illustrative, but does not exhaust the possible physical embodiments of the idea of means underlying my invention.

What I claim as new and desire to secure by Letters Patent of the United States, is:

1. In a combined heating and ventilating system, in combination: a motor, a fan connected to and operable by the motor; an electric circuit including the motor, a manually operable circuit closer, a resistance, a low heat relay coil, a normally closed thermostatic circuit controller and a source of potential; a first and a second normally open circuit controller operable to closed position by the low heat relay coil when energized; a higher speed partial electric circuit including a second manually operable circuit closer and the first normally open circuit controller operable by the low heat relay coil in the closed position connected in shunt of the said resistance whereby the fan may be operated at a relatively low speed and at a higher speed; a low heat heating coil in the path of the air moved by the fan; a circuit for said low heat heating coil including the second normally open circuit controller operable by the low heat relay, a third manually operable circuit closer, and including a source of potential; whereby the fan may be operated at either a low speed or higher speed and the low heat heating coil may or may not have a flow of current therethrough.

2. In a combined heating and ventilating system, in combination: a motor, a fan connected to and operable by the motor; an electric circuit including the motor, a manually operable circuit closer, a resistance, a low heat relay coil, a normally closed thermostatic circuit controller and a source of potential; a first and a second normally open circuit controller operable to closed position by the low heat relay coil when energized; a higher speed partial electric circuit including a second manually operable circuit closer and the first normally open circuit controller operable by the low heat relay coil in the closed position connected in shunt of the said resistance whereby the fan may be operated at a relatively low speed and at a higher speed; a low heat heating coil in the path of the air moved by the fan; a circuit for said low heat heating coil including the second normally open circuit controller operable by the low heat relay, a third manually operable circuit closer, and including a source of potential; whereby the fan may be operated at either a low speed or a higher speed and the low heat heating coil may or may not have a flow of current therethrough; a higher heat relay coil; a normally open circuit controller operable by the higher heat relay coil; a circuit for the higher heat relay coil including a source of potential, the second normally open circuit controller operable by the low heat relay coil, the third manually operable circuit closer and a fourth manually operable circuit closer; a higher heat heating coil; a circuit for the higher heat heating coil including a source of potential and the circuit controller of the higher heat relay coil.

3. In a combined heating and ventilating system, in combination: a motor, a fan connected to and operable by the motor; an electric circuit including the motor, a first manually operable circuit closer, a resistance, a low heat relay coil, a normally closed thermostatic circuit controller and a source of potential; a first and a second normally open circuit controller operable to closed position by the low heat relay coil when energized; a higher speed partial electric circuit including a second manually operable circuit closer and the first normally open circuit controller operable by the low heat relay coil in the closed position connected in shunt of the said resistance whereby the fan may be operated at a relatively low speed and at a higher speed; a low heat heating coil in the path of the air moved by the fan; a circuit for said low heat heating coil including the second normally open circuit controller operable by the low heat relay, a third manually operable circuit closer, and including a source of potential; whereby the fan may be operated at either a low speed or a higher speed and the low heat heating coil may or may not have a flow of current therethrough; a higher heat relay coil; a normally open circuit controller operable by the higher heat relay coil; a circuit for the higher heat relay coil including a source of potential, the second normally open circuit controller operable by the low heat relay coil, and a fourth manually operable circuit closer; a higher heat heating coil; a circuit for the higher heat heating coil including a source of potential and the circuit controller of the higher heat relay coil; a second thermostatic device in the path of air moved by the fan over the heating coils and including a circuit controller closed at a definite relatively high temperature; and a partial circuit including the second thermostatic circuit controller and including a limiting resistance in shunt of the higher heat relay coil whereby when the thermostat is in contact with air of a definite elevated temperature the shunt circuit will be closed and the higher heat relay coil will be de-energized thereby breaking the circuit for the higher heat heating coil; said first mentioned thermostatic circuit controller being in the path of the air moved over the heating coils, said first mentioned thermostatic circuit controller including a latch holding it in closed position against means biasing it to open position and unlatched by a rise in temperature to a predetermined extent whereby the circuit of the motor is broken.

ROBERT J. PARSONS.